(12) United States Patent
Miyashita et al.

(10) Patent No.: US 9,849,790 B2
(45) Date of Patent: Dec. 26, 2017

(54) UTILITY VEHICLE

(71) Applicant: Kubota Corporation, Osaka-shi (JP)

(72) Inventors: Shunsuke Miyashita, Sakai (JP);
Yukifumi Yamanaka, Sakai (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 15/358,502

(22) Filed: Nov. 22, 2016

(65) Prior Publication Data

US 2017/0267107 A1 Sep. 21, 2017

(30) Foreign Application Priority Data

Mar. 17, 2016 (JP) .................................. 2016-053938

(51) Int. Cl.
| | | |
|---|---|---|
| *H02J 7/04* | (2006.01) | |
| *B60L 11/02* | (2006.01) | |
| *H01M 10/48* | (2006.01) | |
| *H01M 10/44* | (2006.01) | |
| *H01M 10/46* | (2006.01) | |
| *B60L 11/18* | (2006.01) | |
| *H02J 7/00* | (2006.01) | |

(52) U.S. Cl.
CPC ........... *B60L 11/02* (2013.01); *B60L 11/1862* (2013.01); *B60L 11/1872* (2013.01); *H01M 10/443* (2013.01); *H01M 10/46* (2013.01); *H01M 10/486* (2013.01); *H02J 7/007* (2013.01); *H01M 2220/20* (2013.01)

(58) Field of Classification Search
CPC .. B60L 11/02; B60L 11/1862; B60L 11/1851; B60L 11/187; B60L 11/1872
See application file for complete search history.

(56) References Cited

U.S. PATENT DOCUMENTS

| | | | | |
|---|---|---|---|---|
| 6,232,744 | B1 * | 5/2001 | Kawai | B60K 6/28 |
| | | | | 180/65.235 |
| 8,269,462 | B2 * | 9/2012 | Yamamoto | B60L 11/1864 |
| | | | | 307/66 |
| 8,321,082 | B2 * | 11/2012 | Ando | B60K 6/365 |
| | | | | 208/1 |
| 8,704,490 | B2 * | 4/2014 | Minamiura | H01M 10/44 |
| | | | | 320/134 |
| 9,656,662 | B2 * | 5/2017 | Obata | B60W 20/13 |
| 2011/0161025 | A1 * | 6/2011 | Tomura | G01R 31/3651 |
| | | | | 702/63 |
| 2012/0021255 | A1 * | 1/2012 | Kim | H01M 10/441 |
| | | | | 429/7 |

(Continued)

FOREIGN PATENT DOCUMENTS

JP 2015131573 A 2/2015

*Primary Examiner* — Brian Swenson
(74) *Attorney, Agent, or Firm* — The Webb Law Firm

(57) ABSTRACT

A utility vehicle includes an electric motor for driving a propelling device, a battery for supplying electric power to the electric motor, a temperature sensor configured to detect a temperature of the battery, a discharge current setting unit for setting an upper limit discharge current value based on the detected temperature detected by the temperature sensor, and a control unit for regulating discharge current of the battery within the upper limit discharge current value determined by the discharge current setting unit and for controlling driving of the electric motor.

5 Claims, 4 Drawing Sheets

(56) References Cited

U.S. PATENT DOCUMENTS

2014/0042968 A1\* 2/2014 Hiroe .................. H01M 10/443
  320/109
2015/0171495 A1\* 6/2015 Yadgar ................ H01M 10/443
  429/403

\* cited by examiner

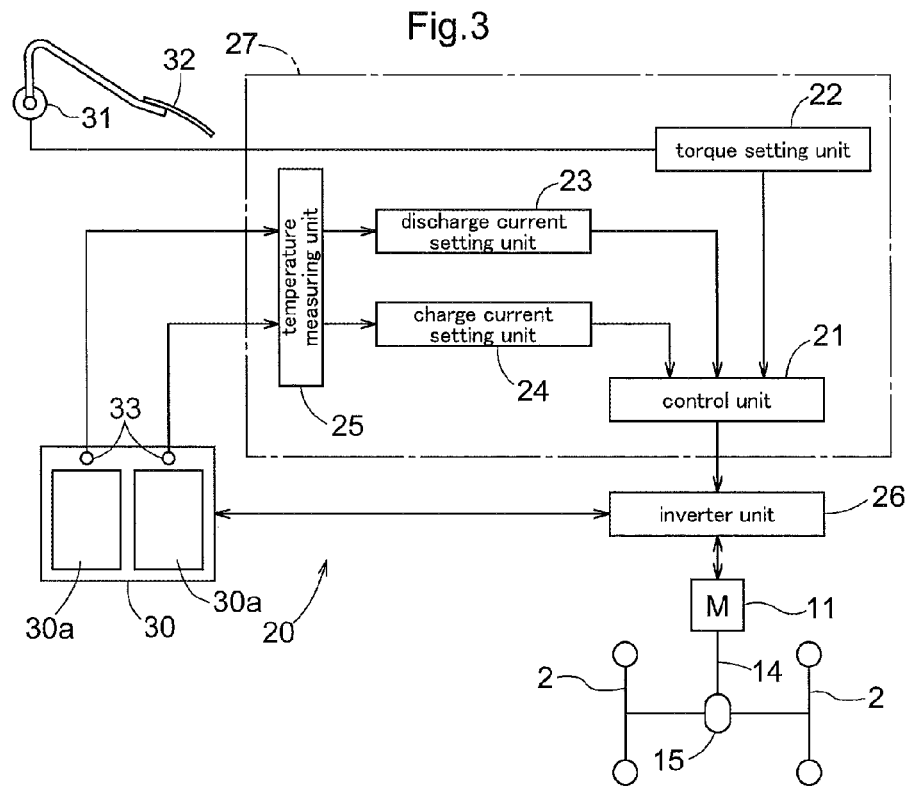
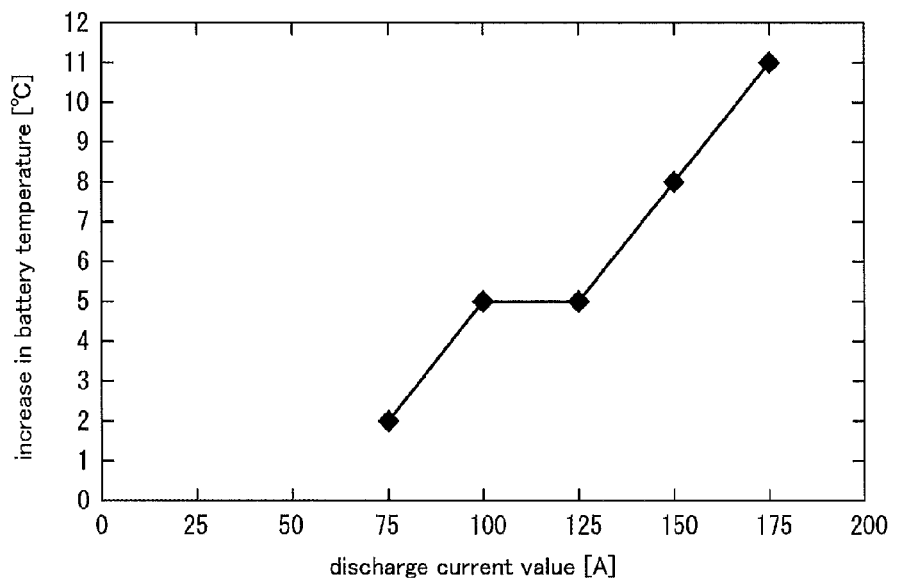

UTILITY VEHICLE

CROSS-REFERENCE TO RELATED APPLICATION

This application claims priority to Japanese Patent Application No. 2016-053938 filed Mar. 17, 2016, the disclosure of which is hereby incorporated in its entirety by reference.

BACKGROUND

An example of a hybrid vehicle is disclosed in Japanese Unexamined Patent Application Publication No. 2015-131573. The hybrid vehicle includes an electric motor for driving a propelling device, and a battery for supplying electric power to the electric motor. The vehicle further includes a temperature sensor for detecting a temperature of the battery, and a vehicle control system for determining allowable output power of the battery based on the detected battery temperature and controlling discharge of the battery to prevent discharge electric power of the battery from exceeding the allowable output power.

When such a utility vehicle includes a lithium ion battery as the battery, for example, the control system determines an upper limit discharge current value based on the detected battery temperature to regulate discharge of the battery so that discharge current of the battery does not exceed the upper limit discharge current value, thereby to reduce deterioration of the battery caused by discharge.

When the battery temperature is falling, this control system gradually increases the upper limit discharge current value as the battery temperature falls so that the lower the battery temperature is, the higher the upper limit discharge current value is. However, if the battery has a high temperature and the upper limit discharge current value is intended to immediately start to increase as the battery temperature falls, the battery temperature falls less easily because the battery has already have the high temperature and further because heat generation also easily occurs in the battery with increase of the discharge current value, as result of which deterioration of the battery is prevented less easily.

On the other hand, when the battery temperature is rising, this control system gradually decreases the upper limit discharge current value as the battery temperature rises so that the higher the battery temperature is, the lower the upper limit discharge current value is. However, if the upper limit discharge current value is set to a maximum discharge current value of the battery and the upper limit discharge current value is intended to immediately start to decrease as the battery temperature rises, power to be supplied to the electric motor drops to easily reduce driving torque of the propelling device.

SUMMARY

A utility vehicle disclosed herein provides a control system for determining an upper limit discharge current value based on detection results of a battery temperature to prevent discharge current of the battery from exceeding the upper limit discharge current value, thereby to easily minimize possible deterioration of the battery and easily supply an electric motor with electric power with a high current value for a long time.

A utility vehicle includes an electric motor configured to drive a propelling device, a battery configured to supply electric power to the electric motor, a temperature sensor configured to detect a temperature of the battery, a discharge current setting unit configured to determine an upper limit discharge current value based on the detected temperature detected by the temperature sensor, and a control unit configured to regulate discharge current of the battery within the upper limit discharge current value determined by the discharge current setting unit and to control driving of the electric motor.

While the detected temperature is falling from a first predetermined temperature to a second predetermined temperature that is lower than the first predetermined temperature, the discharge current setting unit determines a constant upper limit discharge current value as the upper limit discharge current value.

While the detected temperature is falling from the second predetermined temperature to a third predetermined temperature that is lower than the second predetermined temperature, the discharge current setting unit gradually increases the upper limit discharge current value as the detected temperature falls, in which the lower the detected temperature is, the higher the upper limit discharge current value is.

After the detected temperature falls to the third predetermined temperature, the discharge current setting unit determines a maximum discharge current value of the battery as the upper limit discharge current value regardless of a further fall of the detected temperature.

While the detected temperature is rising to a fourth predetermined temperature that is higher than the third predetermined temperature and lower than the first predetermined temperature, the discharge current setting unit determines the maximum discharge current value as the upper limit discharge current value.

While the detected temperature is rising from the fourth predetermined temperature to the first predetermined temperature, the discharge current setting unit gradually decreases the upper limit discharge current value as the detected temperature rises, in which the higher the detected temperature is, the lower the upper limit discharge current value is.

The temperature range from the first predetermined temperature to the second predetermined temperature is determined as a high-temperature range in which the battery temperature falls less easily when the upper limit discharge current value gradually increases with decrease in battery temperature. The temperature range from the second predetermined temperature to the third predetermined temperature is determined as a low-temperature range in which the battery is prevented from deteriorating as much as possible and the electric motor is supplied with electric power with as high a current value as possible when the upper limit discharge current value gradually increases with decrease in battery temperature.

The discharge current setting unit maintains the upper limit discharge current value at a constant value regardless of a fall of the battery temperature within the high-temperature range (from the first predetermined temperature to the second predetermined temperature). Hence, discharge has no great influence on falling of the battery temperature, and thus the battery temperature smoothly drops. Further, the constant upper limit discharge current value causes deterioration of the battery less easily by discharge. In the low-temperature range (from the second predetermined temperature to the third predetermined temperature), the discharge current setting unit gradually increases the upper limit discharge current value with decrease in battery temperature, and thus the battery is prevented from deteriorating as much as possible and the electric motor is supplied with electric power with as high a current value as possible.

The fourth predetermined temperature is determined as an upper limit battery temperature within the low-temperature range in which the battery deteriorates less easily if the maximum discharge current value of the battery is maintained with no change in upper limit discharge current value when the battery temperature is rising. The temperature range from the fourth predetermined temperature to the first predetermined temperature is determined as a temperature range in which the upper limit discharge current value gradually decreases as the battery temperature rises, and thus the battery is prevented from deteriorating as much as possible and the electric motor is supplied with electric power with as high a current value as possible.

The discharge current setting unit maintains the upper limit discharge current value at the maximum discharge current value of the battery with the battery temperature being relatively low until the battery temperature reaches the fourth predetermined temperature, and thus the battery is prevented from deteriorating as much as possible and the electric motor is supplied with electric power with the maximum discharge current value of the battery. In the temperature range from the fourth predetermined temperature to the first predetermined temperature, the discharge current setting unit gradually decreases the upper limit discharge current value as the battery temperature rises, and thus the battery is prevented from deteriorating as much as possible and the electric motor is supplied with electric power with as high a current value as possible.

The control system, which determines the upper limit discharge current value based on the detection results of the battery temperature to supply the electric motor with electric power with a high current value and reduce possible deterioration of the battery caused by discharge, maintains the upper limit discharge current value at a constant value when the battery temperature is falling within the high-temperature range (from the first predetermined temperature to the second predetermined temperature), as a result of which the battery temperature smoothly drops to the low-temperature range to reduce the deterioration of the battery more easily. Further, when the battery temperature is rising in the low-temperature range, the control system maintains the upper limit discharge current value at the maximum discharge current value of the battery until the battery temperature reaches the limit value (fourth predetermined temperature) at which the battery may deteriorate less easily. As a result, the electric motor is supplied with electric power with a high current value corresponding to the maximum current value of the battery for as long a time as possible.

In one or more embodiments, the utility vehicle further includes a generator for supplying electric power to the battery, and a charge current setting unit for determining an upper limit charge current value based on the detected temperature detected by the temperature sensor.

The control unit regulates charge current of the battery within the upper limit charge current value determined by the charge current setting unit.

While the detected temperature is falling from the first predetermined temperature to the second predetermined temperature, the charge current setting unit determines a constant upper limit charge current value as the upper limit charge current value.

While the detected temperature is falling from the second predetermined temperature to the third predetermined temperature, the charge current setting unit gradually increases the upper limit charge current value as the detected temperature falls, in which the lower the detected temperature is, the higher the upper limit charge current value is.

After the detected temperature falls to the third predetermined temperature, the charge current setting unit determines a maximum charge current value of the battery as the upper limit charge current value regardless of a further fall of the detected temperature.

While the detected temperature is rising to the fourth predetermined temperature, the charge current setting unit determines the maximum charge current value as the upper limit charge current value.

While the detected temperature is rising from the fourth predetermined temperature to the first predetermined temperature, the charge current setting unit gradually decreases the upper limit charge current value as the detected temperature rises, in which the higher the detected temperature is, the lower the upper limit charge current value is.

The temperature range from the first predetermined temperature to the second predetermined temperature is determined as a high-temperature range in which the battery temperature falls less easily when the upper limit charge current value gradually increases with decrease in battery temperature. The temperature range from the second predetermined temperature to the third predetermined temperature is determined as a low-temperature range in which the battery is prevented from deteriorating as much as possible and the battery is supplied with electric power with as high a current value as possible when the upper limit charge current value gradually increases with decrease in battery temperature.

The charge current setting unit maintains the upper limit charge current value at a constant value regardless of a fall of the battery temperature within the high-temperature range (from the first predetermined temperature to the second predetermined temperature). Hence, electric charge has no great influence on falling of the battery temperature, and thus the battery temperature smoothly drops. Further, the constant upper limit charge current value causes deterioration of the battery less easily by electric charge. In the low-temperature range (from the second predetermined temperature to the third predetermined temperature), the charge current setting unit gradually increases the upper limit charge current value with decrease in battery temperature, and thus the battery is prevented from deteriorating as much as possible and the battery is supplied with electric power with as high a current value as possible.

The fourth predetermined temperature is determined as an upper limit battery temperature within the low-temperature range in which the battery deteriorates less easily if the maximum charge current value of the battery is maintained with no change in upper limit charge current value when the battery temperature is rising. In the temperature range from the fourth predetermined temperature to the first predetermined temperature, the upper limit charge current value gradually decreases as the battery temperature rises, and thus the battery is prevented from deteriorating as much as possible and the battery is supplied with electric power with as high a current value as possible.

The charge current setting unit maintains the upper limit charge current value at the maximum charge current value of the battery with the battery temperature being relatively low until the battery temperature reaches the fourth predetermined temperature, and thus the battery is prevented from deteriorating as much as possible and the battery is supplied with electric power with the maximum charge current value of the battery. In the temperature range from the fourth predetermined temperature to the first predetermined temperature, the charge current setting unit gradually decreases the upper limit charge current value as the battery temperature rises, and thus the battery is prevented from deteriorating as much as possible and the battery is supplied with electric power with as high a current value as possible.

The control system, which determines the upper limit charge current value based on the detection results of a battery temperature to supply the battery with electric power with a high current value and reduce possible deterioration of the battery caused by electric charge, maintains the upper limit charge current value at a constant value when the battery temperature is falling within the high-temperature range (from the first predetermined temperature to the second predetermined temperature), as a result of which the battery temperature smoothly drops to the low-temperature range to reduce the deterioration of the battery caused by electric charge more easily. Further, when the battery temperature is rising in the low-temperature range, the control system maintains the upper limit charge current value at the maximum charge current value of the battery until the battery temperature reaches the limit value (fourth predetermined temperature) at which the battery may deteriorate less easily. As a result, the battery is supplied with electric power with a high current value corresponding to the maximum current value of the battery.

In one or more embodiments, while the detected temperature is rising from the first predetermined temperature to a fifth predetermined temperature that is higher than the first predetermined temperature, the charge current setting unit determines the constant upper limit charge current value as the upper limit charge current value regardless of a change of the detected temperature.

The temperature range from the first predetermined temperature to the fifth predetermined temperature is a high-temperature range in which the battery deteriorates easily. Further, it becomes more difficult to prevent the deterioration of the battery when the current value supplied to the battery changes with a change of the upper limit charge current value. However, the control system maintains the upper limit charge current value at a constant value to prevent the current value supplied to the battery from varying regardless of a change of the battery temperature, which reduce the deterioration of the battery more easily. For example, if the control system determines a current value at which electric charge causes no heat generation in the battery as the constant upper limit charge current value, no rise in battery temperature is caused by power supply, which reduces the deterioration of the battery more easily.

In one or more embodiments, the fourth predetermined temperature is equal to the second predetermined temperature.

Such an arrangement achieves a simple control system providing a fewer number of predetermined temperatures for comparison with the temperature detected by the temperature sensor, compared with a system in which the fourth predetermined temperature differs from the second predetermined temperature.

BRIEF DESCRIPTION OF DRAWINGS

FIG. 3 is a block diagram of a front-wheel drive control system;
FIG. 4 is a graphic representation showing relationships between discharge current values and increase in battery temperature.

DETAILED DESCRIPTION

Figure 1:
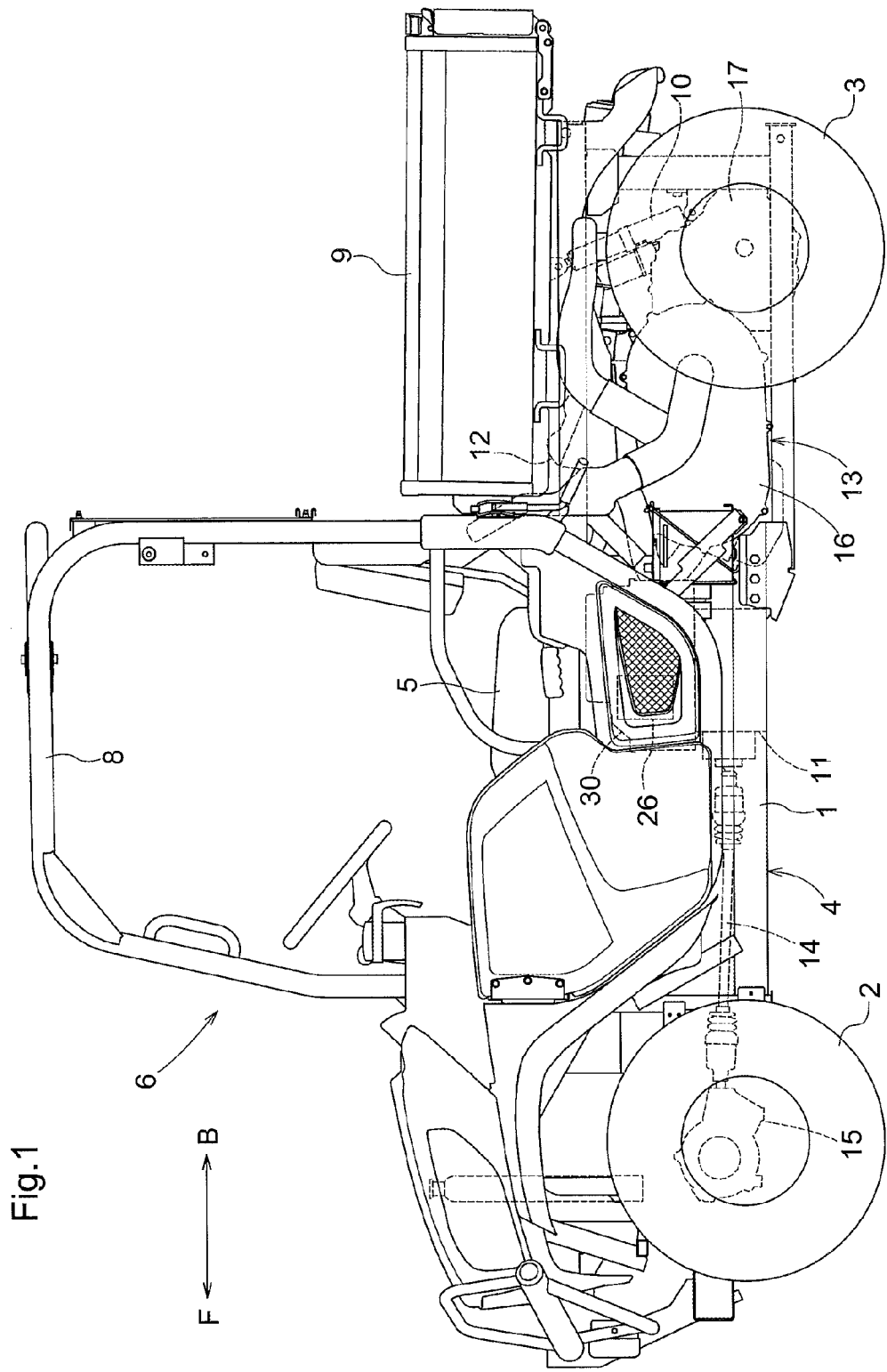
FIG. 1 is a left side view of a utility vehicle.
Figure 2:
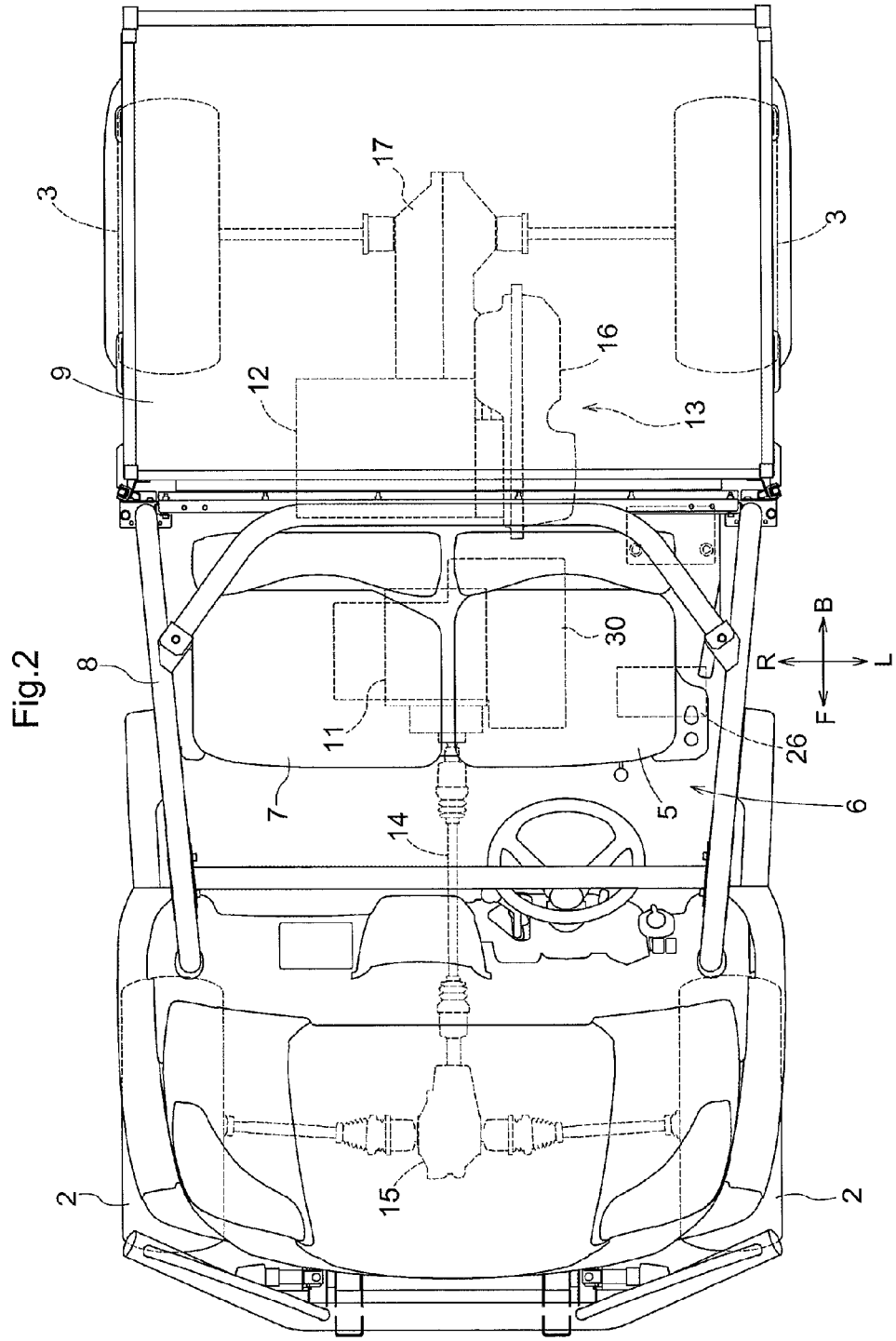
FIG. 2 is a top plan view of the utility vehicle.

Embodiments of a utility vehicle will be described hereinafter in reference to the accompanying drawings. In FIGS. 1 and 2, the directions "F," "B," "R" and "L" are defined as "front (forward)," "rear (rearward)," "right," and "left," respectively.

Referring to FIGS. 1 and 2, the utility vehicle includes a vehicle body 4 with a vehicle frame 1 having a pair of steerable, driving right and left front wheels 2 mounted forward of the vehicle frame 1 and a pair of driving rear wheels 3 mounted rearward of the vehicle body 1, a driver's section 6 having a driver's seat 5 mounted in an intermediate part of the vehicle body 4 in a vehicle front-rear direction, and a loading platform 9 mounted rearward of the vehicle body 4. The driver's section 6 is also provided with a passenger seat 7, and a rollover protection structure (ROPS) 8. The loading platform 9 is supported to be vertically pivotable about a rear pivotal point and raised or lowered through an elevation mechanism 10 for dumping or discharging a load rearward.

The vehicle further includes a motor section 13 extending between an underside of the driver's section 6 and an underside of the loading platform 9. The motor section 13 includes an electric motor 11 and an engine 12. The vehicle body 4 is switchable between a four-wheel drive mode, a two-front-wheel drive mode, and a two-rear-wheel drive mode. In the four-wheel drive mode, the front wheels 2 are driven by the electric motor 11 and the rear wheels 3 are driven by the engine 12. In the two-front-wheel drive mode, the front wheels 2 are driven by the electric motor 11 with no driving power being transmitted from the engine 12 to the rear wheels 3. In the two-rear-wheel drive mode, the rear wheels 3 are driven by the engine 12 with no driving power being transmitted from the electric motor 11 to the front wheels 2. When the front wheels 2 are driven by the electric motor 11, the driving power is transmitted from the electric motor 11 to a front-wheel-drive transmission 15 via a rotary shaft 14. When the rear wheels 3 are driven by the engine 12, the driving power is transmitted from the engine 12 to a rear-wheel-drive transmission 17 via a belt variable speed transmission 16.

Referring to FIG. 3, a front-wheel drive control system 20 includes a control unit 21, a torque setting unit 22, a discharge current setting unit 23, a charge current setting unit 24, a temperature measuring unit 25, and an inverter unit 26. The control unit 21, torque setting unit 22, discharge current setting unit 23, charge current setting unit 24, and temperature measuring unit 25 constitute a control device 27 including a microcomputer.

The inverter unit 26 is connected to the electric motor 11 and a battery 30. The electric motor 11 is formed as a motor generator unit, and the battery 30 is formed as a lithium ion battery. The inverter unit 26 converts DC electric power outputted from the battery 30 to AC electric power and supplies the AC electric power to the electric motor 11 to achieve power supply from the battery 30 to the electric motor 11. When the electric motor 11 is activated as a generator, the inverter unit 26 converts AC electric power outputted from the electric motor 11 to DC electric power and supplies the DC electric power to the battery 30 to achieve power supply from the electric motor 11 to the battery 30.

The torque setting unit 22 is connected to an acceleration sensor 31 which detects an operating amount of an acceleration pedal 32. The torque setting unit 22 receives output of the operating amount of the pedal detected by the acceleration sensor 31 to determine front-wheel driving torque corresponding to the detected operating amount and output the determined front-wheel driving torque to the control unit 21.

The temperature measuring unit 25 is connected to two temperature sensors 33. In one or more embodiments, the battery 30 includes two modules 30a. The two temperature sensors 33 correspond one-to-one to the two modules 30a. Each of the temperature sensors 33 detects an actual temperature (battery temperature) of the corresponding module 30a. The temperature measuring unit 25 receives output of the temperatures detected by the two temperature sensors 33 to determine the higher temperature of the detected temperatures as an overall temperature of the battery 30 and outputs the determined temperature to the discharge current setting unit 23 and the charge current setting unit 24. In one or more embodiments, the temperature measuring unit 25 may determine an average temperature of the temperatures detected by the two temperature sensors 33 as the overall temperature of the battery 30, instead of determining the higher temperature of the detected temperatures as the overall temperature of the battery 30. In one or more embodiments, the battery 30 may include only one module 30a, or three or more modules 30a, instead of two modules 30a.

The discharge current setting unit 23 receives output of the temperature determined at the temperature measuring unit 25, as a result of which the higher temperature of the temperatures detected by the two temperature sensors 33 is determined as the overall temperature of the battery 30. The discharge current setting unit 23 then determines an upper limit discharge current value corresponding to the determined overall temperature and outputs the determined upper limit discharge current value to the control unit 21.

The control unit 21 controls the inverter unit 26 based on the determined front-wheel driving torque received from the torque setting unit 22 and achieves power supply from the battery 30 to the electric motor 11 to drive the electric motor 11. In this, the control unit 21 computes upper limit driving torque based on the upper limit discharge current value determined at the discharge current setting unit 23, voltage applied in predetermined time intervals, and electrical efficiency (which is obtained by multiplying electric motor efficiency by inverter efficiency) to control the inverter unit 26 based on the obtained upper limit driving torque. As a result, the control unit 21 regulates discharge of the battery 30 so that the front-wheel driving torque does not exceed the obtained upper limit driving torque. Further, with the control of the inverter unit 26 based on the upper limit discharge current value determined at the discharge current setting unit 23, the control unit 21 regulates discharge of the battery 30 so that discharge current from the battery 30 does not exceed the determined upper limit discharge current value.

The acceleration pedal 32 is pressed down to allow the control unit 21 to control the inverter unit 26 based on the information received from the torque setting unit 22 to achieve power supply from the battery 30 to the electric motor 11. Then, the front wheels 2 are driven by the electric motor 11 to propel the vehicle body 4. In this, the control unit 21 controls the inverter unit 26 based on the upper limit discharge current value determined at the discharge current setting unit 23 to regulate discharge of the battery 30 so that the discharge current of the battery 30 does not exceed the determined upper limit discharge current value and that the front-wheel driving torque does not exceed the obtained upper limit driving torque. As a result, the electric motor 11 is driven with possible deterioration of the battery 30 caused by discharge being minimized.

The charge current setting unit 24 receives output of the temperature determined at the temperature measuring unit 25, as a result of which the higher temperature of the temperatures detected by the two temperature sensors 33 is determined as the overall temperature of the battery 30. The charge current setting unit 24 then determines an upper limit charge current value corresponding to the determined overall temperature and outputs the determined upper limit charge current value to the control unit 21.

When the electric motor 11 acts as a generator to supply electric power to the battery 30, the control unit 21 controls the inverter unit 26 based on the upper limit charge current value determined at the charge current setting unit 24 to regulate electric charge of the battery 30 so that the charge current of the battery 30 does not exceed the determined upper limit charge current value. As a result, the battery 30 is charged with electric power with possible deterioration of the battery 30 caused by electric charge being minimized.

How the upper limit discharge current value is determined at the discharge current setting unit 23 and how the upper limit charge current value is determined at the charge current setting unit 24 will be described hereinafter in detail.

Figure 5:
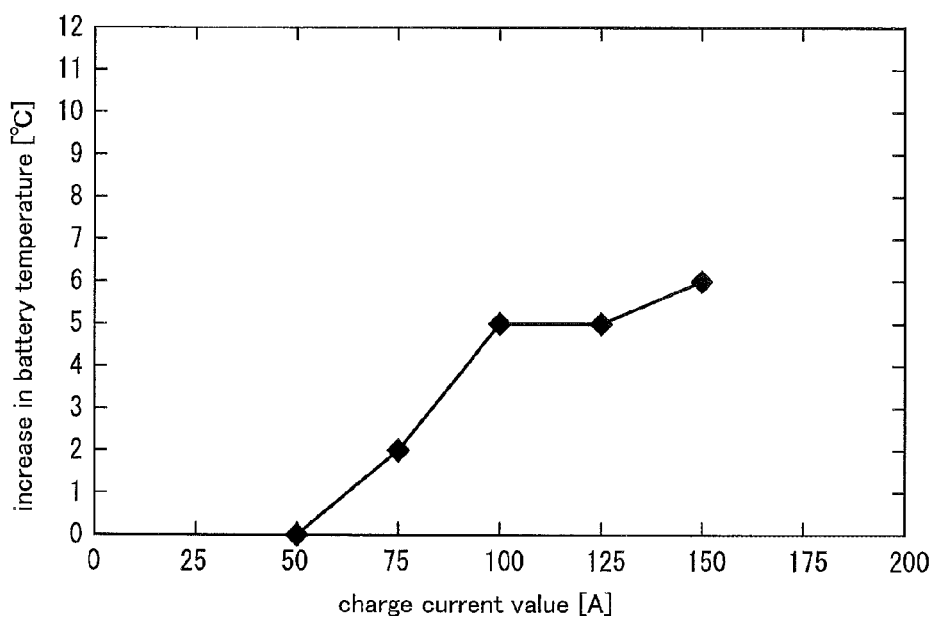
FIG. 5 is a graphic representation showing relationships between charge current values and increase in battery temperature.
Figure 6:
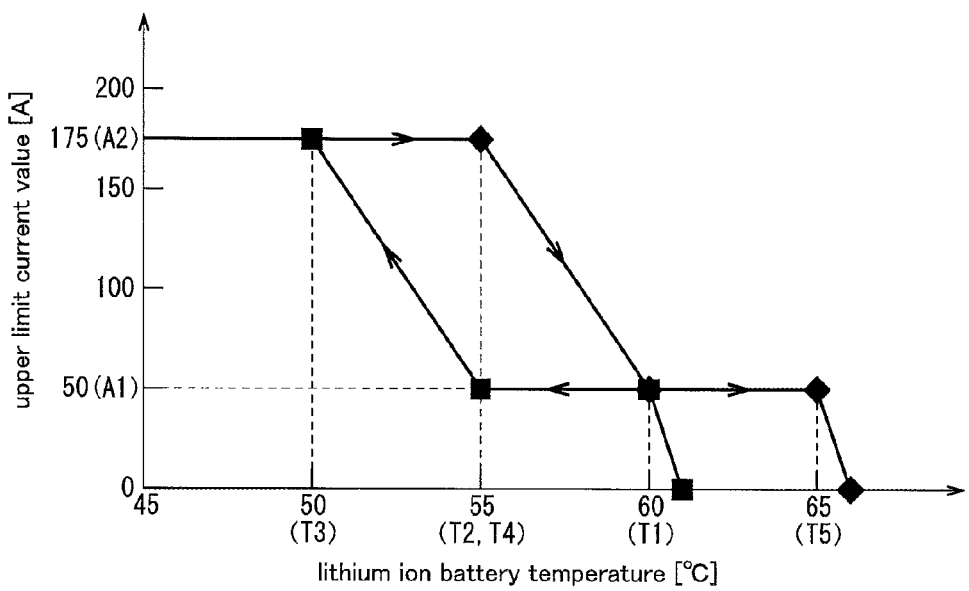
FIG. 6 is a graphic representation showing a charging/discharging profile.

FIGS. 4 and 5 show results obtained from discharging/charging tests performed on the battery 30. FIG. 6 shows a discharging/charging profile which has been produced based on the results of the discharging/charging tests. The discharge current setting unit 23 determines the upper limit discharge current value based on the temperature detected by the temperature sensors 33 and the discharging/charging profile in FIG. 6. The charge current setting unit 24 determines the upper limit charge current value based on the temperature detected by the temperature sensors 33 and the discharging/charging profile in FIG. 6.

More particularly, the discharge current setting unit 23 receives, at regular time intervals, output of temperatures detected by the temperature sensors 33 several times in each time interval via the temperature measuring unit 25 to determine whether the temperature detected in each time interval is falling or rising. The discharge current setting unit 23 determines the upper limit discharge current value as follows when it determines that the detected temperature is falling.

While the detected temperature is falling from a first predetermined temperature T1 to a second predetermined temperature T2 that is lower than the first predetermined temperature T1, the discharge current setting unit 23 determines a constant upper limit discharge current value A1 as the upper limit discharge current value.

While the detected temperature is falling from the second predetermined temperature T2 to a third predetermined temperature T3 that is lower than the second predetermined temperature T2, the discharge current setting unit 23 gradually increases the upper limit discharge current value as the detected temperature falls so that the lower the detected temperature is, the higher the upper limit discharge current value is.

After the detected temperature falls to the third predetermined temperature T3, the discharge current setting unit 23 determines a maximum discharge current value A2 of the battery 30 as the upper limit discharge current value regardless of a further fall of the detected temperature.

The discharge current setting unit 23 determines the upper limit discharge current value as follows when it determines that the detected temperature is rising.

While the detected temperature is rising to a fourth predetermined temperature T4 that is higher than the third predetermined temperature T3 and lower than the first predetermined temperature T1, the discharge current setting unit 23 determines the maximum discharge current value as the upper limit discharge current value.

While the detected temperature is rising from the fourth predetermined temperature T4 to the first predetermined temperature T1, the discharge current setting unit 23 gradually decreases the upper limit discharge current value as the detected temperature rises so that the higher the detected temperature is, the lower the upper limit discharge current value is.

While the detected temperature is rising from the first predetermined temperature T1 to a fifth predetermined temperature T5 that is higher than the first predetermined temperature T1, the discharge current setting unit 23 determines the constant upper limit discharge current value A1 as the upper limit discharge current value.

The charge current setting unit 24 receives, at regular time intervals, output of temperatures detected by the temperature sensors 33 several times in each time interval via the temperature measuring unit 25 to determine whether the temperature detected in the time interval is falling or rising. The charge current setting unit 24 determines the upper limit charge current value as follows when it determines that the detected temperature is falling.

While the detected temperature is falling from the first predetermined temperature T1 to the second predetermined temperature T2 that is lower than the first predetermined temperature T1, the charge current setting unit 24 determines a constant upper limit charge current value A1 as the upper limit charge current value.

While the detected temperature is falling from the second predetermined temperature T2 to the third predetermined temperature T3 that is lower than the second predetermined temperature T2, the charge current setting unit 24 gradually increases the upper limit charge current value as the detected temperature falls so that the lower the detected temperature is, the higher the upper limit charge current value is.

After the detected temperature falls to the third predetermined temperature T3, the charge current setting unit 24 determines a maximum charge current value A2 of the battery 30 as the upper limit charge current value regardless of a further fall of the detected temperature.

The charge current setting unit 24 determines the upper limit charge current value as follows when it determines that the detected temperature is rising.

While the detected temperature is rising to the fourth predetermined temperature T4 that is higher than the third predetermined temperature T3 and lower than the first predetermined temperature T1, the charge current setting unit 24 determines the maximum charge current value as the upper limit charge current value.

While the detected temperature is rising from the fourth predetermined temperature T4 to the first predetermined temperature T1, the charge current setting unit 24 gradually decreases the upper limit charge current value as the detected temperature rises so that the higher the detected temperature is, the lower the upper limit charge current value is.

While the detected temperature is rising from the first predetermined temperature T1 to the fifth predetermined temperature T5 that is higher than the first predetermined temperature T1, the charge current setting unit 24 determines the constant upper limit charge current value A1 as the upper limit charge current value.

In the current embodiment, the fourth predetermined temperature T4 is equal to the second predetermined temperature T2. Instead, the fourth predetermined temperature T4 may be lower or higher than the second predetermined temperature T2.

In the current embodiment, the first predetermined temperature T1 is set to approximately 60° C., the second predetermined temperature T2 is set to approximately 55° C., the third predetermined temperature T3 is set to approximately 50° C., and the fifth predetermined temperature T5 is set to approximately 65° C. Instead, the first, second, third or fifth predetermined temperatures may be set to any other value depending on the properties of the battery.

The upper limit discharge current value and the upper limit charge current value A1 determined while the detected temperature is falling from the first predetermined temperature T1 to the second predetermined temperature T2, and the upper limit charge current value A1 determined while the detected temperature is rising from the first predetermined temperature T1 to the fifth predetermined temperature T5 are values at which no heat generation substantially occurs by discharge or charge of the battery.

ALTERNATIVE EMBODIMENTS

1. In the above embodiment, only the front wheels 2 are driven by the electric motor 11. Instead, the front wheels 2 may be driven by the engine and the rear wheels 3 may be driven by the electric motor. Alternatively, both the front wheels 2 and the rear wheels 3 may be driven by the electric motor.

2. In the above embodiment, the hybrid vehicle including the propelling electric motor 11 and the propelling engine 12 has been described. The vehicle may dispense with the engine to include only the electric motor.

What is claimed is:
1. A utility vehicle comprising:
an electric motor configured to drive a propelling device;
a battery configured to supply electric power to the electric motor;
a temperature sensor configured to detect a temperature of the battery;
a discharge current setting unit configured to determine an upper limit discharge current value based on the detected temperature detected by the temperature sensor; and
a control unit configured to regulate discharge current of the battery within the upper limit discharge current value determined by the discharge current setting unit and to control driving of the electric motor;
wherein, while the detected temperature is falling from a first predetermined temperature to a second predetermined temperature that is lower than the first predetermined temperature, the discharge current setting unit determines a constant upper limit discharge current value as the upper limit discharge value,
while the detected temperature is falling from the second predetermined temperature to a third predetermined temperature that is lower than the second predetermined temperature, the discharge current setting unit gradually increases the upper limit discharge current value as the detected temperature falls, in which the lower the detected temperature is, the higher the upper limit discharge current value is, after the detected temperature falls to the third predetermined temperature, the discharge current setting unit determines a maximum discharge current value of the battery as the upper limit discharge current value regardless of a further fall of the detected temperature, while the detected temperature is rising to a fourth predetermined temperature that is higher than the third predetermined temperature and lower than the first predetermined temperature, the discharge current setting unit determines the maximum discharge current value as the upper limit discharge current value, and while the detected temperature is rising from the fourth predetermined temperature to the first predetermined temperature, the discharge current setting unit gradually decreases the upper limit discharge current value as the detected temperature rises, in which the higher the detected temperature is, the lower the upper limit discharge current value is.

2. The utility vehicle according to claim 1, further comprising:

a generator configured to supply electric power to the battery; and a charge current setting unit configured to determine an upper limit charge current value based on the detected temperature detected by the temperature sensor;

wherein the control unit is configured to regulate charge current of the battery within the upper limit charge current value determined by the charge current setting unit, while the detected temperature is falling from the first predetermined temperature to the second predetermined temperature, the charge current setting unit determines a constant upper limit charge current value as the upper limit charge current value, while the detected temperature is falling from the second predetermined temperature to the third predetermined temperature, the charge current setting unit gradually increases the upper limit charge current value as the detected temperature falls, in which the lower the detected temperature is, the higher the upper limit charge current value is, after the detected temperature falls to the third predetermined temperature, the charge current setting unit determines a maximum charge current value of the battery as the upper limit charge current value regardless of a further fall of the detected temperature, while the detected temperature is rising to the fourth predetermined temperature, the charge current setting unit determines the maximum charge current value as the upper limit charge current value, and while the detected temperature is rising from the fourth predetermined temperature to the first predetermined temperature, the charge current setting unit gradually decreases the upper limit charge current value as the detected temperature rises, in which the higher the detected temperature is, the lower the upper limit charge current value is.

3. The utility vehicle according to claim 2, wherein while the detected temperature is rising from the first predetermined temperature to a fifth predetermined temperature that is higher than the first predetermined temperature, the charge current setting unit determines the constant upper limit charge current value as the upper limit charge current value regardless of a change of the detected temperature.

4. The utility vehicle according to claim 2, wherein the fourth predetermined temperature is equal to the second predetermined temperature.

5. The utility vehicle according to claim 1, wherein the fourth predetermined temperature is equal to the second predetermined temperature.

\* \* \* \* \*